US009420053B2

(12) United States Patent
Allen et al.

(10) Patent No.: US 9,420,053 B2
(45) Date of Patent: Aug. 16, 2016

(54) CANONICALIZATION OF BADLY-FORMED MESSAGES

(75) Inventors: Nicholas Alexander Allen, Redmond, WA (US); John Anthony Taylor, Bellevue, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1885 days.

(21) Appl. No.: 12/129,588

(22) Filed: May 29, 2008

(65) Prior Publication Data

US 2009/0300647 A1    Dec. 3, 2009

(51) Int. Cl.
*G06F 9/46*    (2006.01)
*G06F 9/54*    (2006.01)
*H04L 29/08*    (2006.01)
*G06F 11/30*    (2006.01)

(52) U.S. Cl.
CPC ............ *H04L 67/2823* (2013.01); *G06F 9/546* (2013.01); *G06F 11/30* (2013.01)

(58) Field of Classification Search
None
See application file for complete search history.

(56) References Cited

U.S. PATENT DOCUMENTS

| | | | |
|---|---|---|---|
| 5,577,202 A | 11/1996 | Padgett | |
| 7,069,335 B1 | 6/2006 | Layman et al. | |
| 7,216,255 B2 | 5/2007 | Cabrera et al. | |
| 7,254,577 B2 * | 8/2007 | Gupta | G06F 17/30914 |
| 2002/0184340 A1 | 12/2002 | Srivastava et al. | |
| 2005/0228984 A1 * | 10/2005 | Edery | H04L 63/0227 |
| | | | 713/153 |
| 2006/0106941 A1 | 5/2006 | Singhal et al. | |
| 2006/0168334 A1 | 7/2006 | Potti et al. | |
| 2007/0005786 A1 | 1/2007 | Kumar et al. | |
| 2007/0030848 A1 * | 2/2007 | Miyata et al. | 370/389 |
| 2007/0043825 A1 | 2/2007 | Chouanard et al. | |
| 2008/0025230 A1 | 1/2008 | Patel et al. | |
| 2008/0043684 A1 * | 2/2008 | Hovey | H04L 69/04 |
| | | | 370/338 |

OTHER PUBLICATIONS

SOAP Fault Message Structure; SQL Server 2005 Books Online; http://web.archive.org/web/20070503012443/http://msdn2.microsoft.com/en-us/library/ms189538.aspx; archived May 3, 2007; retrieved Dec. 17, 2011; 3 pages.*
Directory Layout (4 pages) http://www.courier-mta.org/layout.html, retrieved Apr. 30, 2008.

(Continued)

*Primary Examiner* — H S Sough
*Assistant Examiner* — Kimberly Jordan
(74) *Attorney, Agent, or Firm* — Ben Tabor; Harri Valio; Micky Minhas (57) ABSTRACT

The canonicalization of input messages having application specific data into a canonical message format, regardless of whether those native messages are well-formed. When a message is accessed, as long as the message is processable, the message is canonicalized. If the native message is well-formed, then a canonical message is generated that includes the application specific data in a schema understood by the application. On the other hand, if the native message is not well-formed, the canonical message is generated in a manner that the canonical message may be used to access the raw bits of the message, and that includes sufficient information for some downstream processing to determine that the message was not well-formed. That downstream processing may optionally then perform compensatory actions to regain access to the application specific data, and may potentially use information from the canonicalized message to do so.

18 Claims, 3 Drawing Sheets

(56) References Cited

OTHER PUBLICATIONS

Patterns of System Integration with Enterprise Messaging—Jun. 21, 2002 (59 pages) http://jerry.cs.uiuc.edu/~plop/plop2002/final/woolfbrown2.pdf.

Connected Industry Framework Architecture and Design Blueprint—Technical Framework—2005 (149 pages) http://download.microsoft.com/download/9/1/d/91de0664-5bc5-4524-88c1-4d71d5f4aba4/CIF%20-%20Technical%20Framework.doc.

Eudora Extended Message Services API—Jul. 19, 1996 (35 pages) http://www.eudora.com/developers/emsapi/emsapi1.pdf.

\* cited by examiner

CANONICALIZATION OF BADLY-FORMED MESSAGES

BACKGROUND

Application messages are communicated between applications. Often, when an application message is transported, at some point in the chain of transport, the application message is encapsulated as an application-structured data payload in a message envelope. The message envelope may include message metadata, such as headers, addressing information, and transient message properties. The message envelope in combination with the application-structured data payload is often termed an "enveloped message". Message envelopes permit the attaching of such message metadata without requiring that the sender, receiver, or intermediaries understand the application-specific data of the payload.

Distributed applications commonly use enveloped messages, such as with the Simple Object Access Protocol (SOAP) envelope format, to canonicalize and abstract the process of message transmission. These abstractions are not directly available in TCP/IP, HTTP, and other pervasively used networking protocols. Instead, networking protocols commonly transmit the application payload in a byte-oriented format.

For purposes of canonicalization and abstraction of such application payload, a message processor in the message processing pipeline conventionally examines the bytes received from the native networking protocol and attempts to construct an equivalent canonicalized enveloped message. However, the message processor may be unable to successfully complete this translation process for a variety of reasons. For instance, perhaps the network or application software is misconfigured or otherwise defective. In such cases, the message is termed "badly-formed", "badly formatted" or "not well-formed".

Conventionally, this failure in translation may be handled by discarding or rejecting the badly formatted message bytes. However, discarding or rejected messages may be impermissible according to the data handling rules of the distributed application. Even if permissible, discarding or rejecting message may have adverse impact on application performance.

An alternative conventional approach is use a different pipeline (i.e., a failure processing pipeline) if a badly-formed message is encountered. This failure processing pipeline is different than the normal processing pipeline that is used if a well-formed message is encountered. However, entering a failure processing pipeline requires designing, developing, and testing an alternative execution path to the standard message processing pipeline, which adds additional cost and complexity to the distributed application. Also, some scenarios require the application to coordinate rejoining the normal and failure processing pipelines, such as when successful message processing and error recovery activities must be coordinated by a common transaction.

BRIEF SUMMARY

Although not required, some embodiments described herein relate to the canonicalization of native messages having application specific data into a canonical message format, regardless of whether those native messages are well-formed. When a message is accessed, as long as the message is processable, the message is canonicalized in a somewhat differ way depending on whether or not the message is well-formed. Either way, however, a canonical message results.

If the native message is well-formed, then a canonical message is generated that includes the application specific data in a schema understood by the application. On the other hand, if the native message is not well-formed, the canonical message is generated in a manner that the canonical message may be used to access the raw bits of the message, and that includes sufficient information for some downstream processing to determine that the message was not well-formed.

That downstream processing may optionally then perform compensatory actions to regain access to the application specific data. For instance, in one example, the canonical message may include a location of and/or a reason for the native message not being well-formed. This may allow the downstream logic to correct the cause of the native message not being well-formed. Downstream processing may still rely on the message to conform with the canonical message format regardless of whether the native message was well-formed.

This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments described herein relate to the canonicalization of input messages having application specific data into a canonical message format, regardless of whether those input native messages are well-formed. If the input message is well-formed, then a canonical message is generated that includes the application specific data in a schema understood by the application. On the other hand, if the input message is not well-formed, the canonical message is generated in a manner that the canonical message may be used to access the raw bits of the input message, and that includes sufficient information for some downstream processing to determine that the message was not well-formed. That downstream processing may optionally then perform compensatory actions to regain access to the application specific data, and may potentially use information from the canonicalized message to do so.

First, some introductory discussion regarding a computing system in which the principles described herein may be employed will be described with respect to FIG. 1. Then, various embodiments of the canonicalization of well-formed and not well-formed messages will be described with respect to FIGS. 2 through 5.

Figure 1:
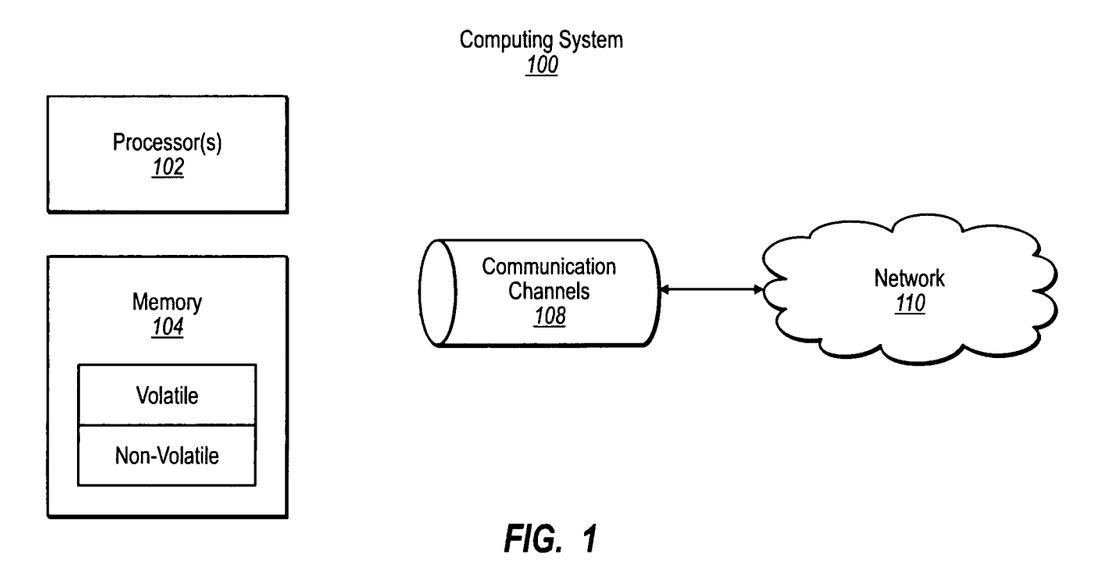
FIG. 1 illustrates a computing system in which embodiments described herein may operate.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term "computer-readable media" as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
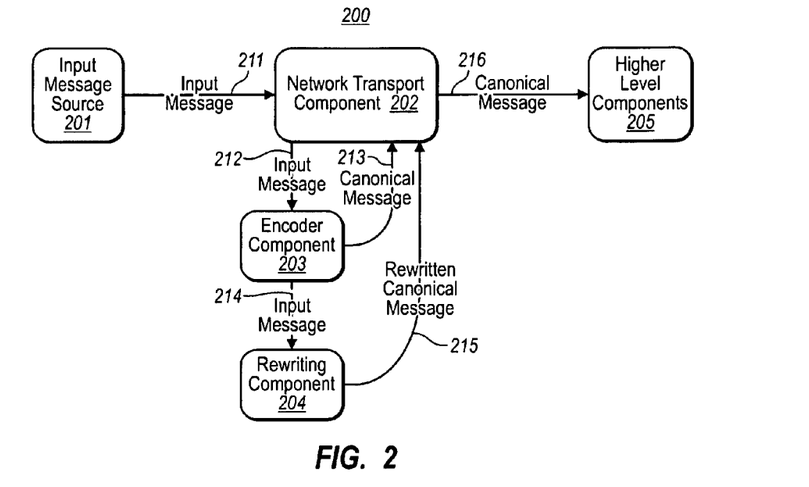
FIG. 2 illustrates an environment in which various input message (both well-formed and not well-formed) may be canonicalized into a canonical message.

FIG. 2 illustrates an environment 200 in which various input messages may each be canonicalized into a canonical message. The environment 200 includes an input message source 201, a network transport component 202, an encoder component 203, a rewriting component 204 and higher level components 205.

The input message source 201 provides input messages to the network transport component 202 as represented by arrow 211. Some of those input messages may be well-formed, and some may not. In one embodiment, the input messages are raw messages represented as a binary sequence of ones and zeros. The input messages may be represented as message on a network transport. The input message source 201 may be, for example, a network.

The network transport component 202 reads the raw message bytes from the network transport. An example of a network transport is HyperText Transport Protocol (HTTP). However, there are a wide variety of other network transports. An enumeration of each would be futile since there are many, and the network transports are known. Furthermore, the inventors anticipate that network transports will continue to be developed in the future. Accordingly, the principles described herein are not limited to any particular transport, whether now existing or whether yet to be developed. The network transport component 202 provides the input message in the form of raw bytes (i.e., a sequence of binary ones and zeros) to the encoder component 203 as represented by arrow 212.

The encoder component 203 translates the raw message into a canonical message format. The canonical message format might permit enveloped messages, which permits metadata to be associated with the raw input message. An example of an enveloped message is a Simple Object Access Protocol (SOAP) envelope, which would allow the message to contain the input message as application payload, and would allow metadata, such as headers, addressing information, transient message properties, and other information.

The encoder component 203 may have a specification for the expected structure of a well-formed raw message that defines whether those raw message bytes can be used to create a message in the canonical message format. As an example of rules that the specification may contain, the encoder component 203 might require that the raw message use a particular text encoding format, content type, or record format. The encoder component might also validate the character sequences and records in the raw message bytes against those formats. The encoder component 203 can thus determine whether or not the raw input message is well-formed. If the input message is well-formed, the encoder component 203 may canonicalize the message and provide the canonicalized message back to the network transport component 202 as represented by the arrow 213. On the other hand, if the input message is not well-formed, the encoder component 203 may provide the raw input message to a rewriting component 204 as represented by arrow 214.

The rewriting component 204 translates the raw input message into the canonical message format despite the fact that the rewriting component 204 receives only badly-formed messages from the encoder component 203. The rewritten canonical message is then provided to the network transport component 202 as represented by arrow 215. Regardless of whether the canonical message corresponds to a well-formed or badly-formed message, the canonical message is then provided to higher level components 205 as represented by arrow 216.

The higher level components 205 perform further message processing and can be thought of as being effectively the downstream components that use the canonicalized message. The canonical message remains canonical, regardless of whether the raw input message was well-formed. Accordingly, those components of the higher level components 205 that rely only on the fact that the message is canonical may continue to rely on that. For instance, all of the canonical messages may be logged. Thus, any such higher level components do not require special case processing of badly formatted messages.

On the other hand, some of the higher level components 205 may choose to recognize the rewritten messages and perform special compensation actions. For instance, the higher level components 205 may recognize that, although the canonical message is canonical, that the corresponding input message was not well-formed. Those higher level components 205 may then perform logic that is helpful to allow for proper interpretation of the application specific data of the badly-formed message. For instance, such higher level components might correct the encoding format designation of the input message.

Figure 3:
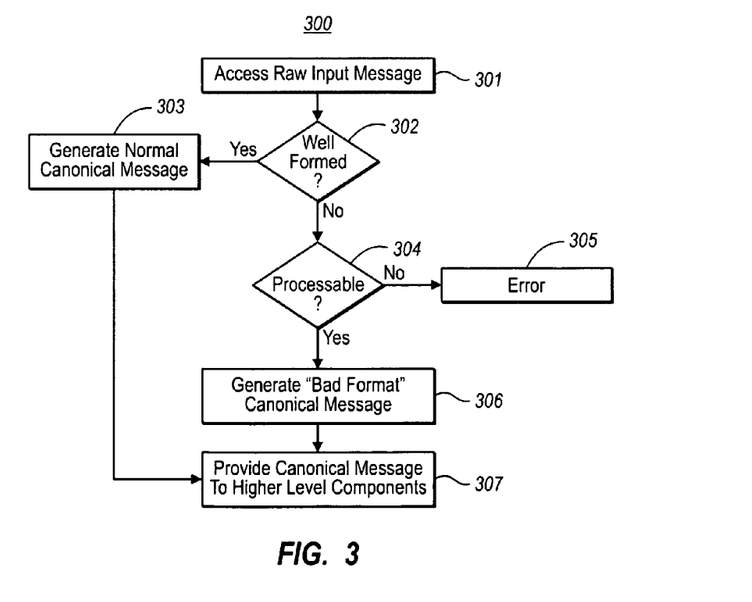
FIG. 3 illustrates a flowchart of a method for canonicalizing messages regardless of whether the message is well-formed or not well-formed.

FIG. 3 illustrates a flowchart of a method 300 for canonicalizing messages regardless of whether the message is well-formed or not well-formed. The method may be performed for each input message received by the network transport component 202 of FIG. 2. Some of the received input messages will be well-formed, others will not. A message is "well-formed" if a decoder is able to decode the message according to the specification of the decoder. The method 300 may be performed in the environment 200 of FIG. 2, although that is not required. Accordingly, the method 300 of FIG. 3 will be described with frequent reference to the environment 200 of FIG. 2 as an example.

First, the encoder accesses a message that contains application-specific data consumable by an application (act 301). Referring to FIG. 2, the raw input messages are accessed by the encoder component 203 via the network transport component 202. Specifically, as an example, the network transport component 202 requests raw message bytes from the raw input message source 201 (see arrow 211 of FIG. 2). The network transport component 202 then passes the raw message bytes to the encoder component 203 (see arrow 212 of FIG. 2).

The encoder then determines whether or not the message is well-formed (decision block 302). Referring to FIG. 2, the encoder component 203 attempts to translate the raw message bytes into a canonical message format. During this translation attempt, the encoder component 203 may determine whether or not the raw input message is well-formed. Encoder components 203 are conventionally able to determine whether or not a message is well-formed, and thus the details of how this is done will not be described in detail here.

If it is determined that the message is well-formed (Yes in decision block 302), a normal canonical message is generated (act 303). The normal canonical message conforms to a canonical message format that is used regardless of whether the message is or is not well-formed. The canonical message format does permit, however, one or more points of extensibility that allows one canonical message to be different than another, even though both messages conform to the same canonical message format. In the case of a normal canonical message, the normal canonical message includes the application-specific data provided in the raw input message, but expressed in a schema understood by the application. Referring to FIG. 2, if the input message is well-formed, then the translation attempt of the encoder component 203 succeeds.

The normal canonical message is then provided to the higher level components (act 307). Referring to FIG. 2, the encoder component 203 passes a normal canonical message in the canonical message format to the higher level components 205 via the network transport component 202 (see arrows 213 and 216 of FIG. 2).

If it is determined that the message is not well-formed (No in decision block 302), it is then determined whether or not is the message processable (decision block 304). If the input message is not processable (No in decision block 304), an error has occurred (act 305). In this case, the translation attempt utterly fails. Referring to FIG. 2, the encoder component 203 might choose to indicate this through an exception mechanism. Examples of raw messages that are unprocessable are raw message bytes with a record format that is too badly damaged to determine where messages begin and end within the communication medium and raw message bytes that cause the system to crash when it attempts to process them.

If the message is not well-formed (No in decision block 302), but the input message is processable (Yes in decision block 304), a "bad format" canonical message is generated (act 306). The bad format canonical message also conforms to the same canonical message format as the normal canonical message. In this description, a bad format canonical message is a canonical message that is generated when the input message is not well-formed. In the case of a bad format canonical message, the canonical message either includes or may be used to obtain the raw bits of the application-specific data. Additionally, the bad format canonical message includes sufficient information for downstream processing (i.e., higher level components 205 of FIG. 2) to determine that the message was not well-formed. In this case, referring to FIG. 2, the encoder component 203 passes the raw messages bytes to the rewriting component (see arrow 214). Furthermore, the rewriting component 204 constructs the bad format canonical message in the canonical message format.

The rewritten message may contain the raw message bytes that make up the message, a stream from which the raw message bytes can be read, and/or a reference to where the raw message bytes can be obtained. As an example, upon the encoder component 203 encountering an error in the encoding process, the encoder component 203 might defer further reading of the raw message bytes. The rewriting component 204 may optionally then include the read bytes in the rewritten canonical message, with the remaining bytes perhaps being provided as a message byte stream to the higher level components 205. This prevents message rewriting from being a system bottleneck as considerable Input/Output (I/O) may be required to capture the raw message bytes, and as the raw message bytes may exceed the memory or processing capacity of the system to read into a message. In addition, the higher level components might decide that the message can be discarded after all. In that case, capturing all of the raw message bytes might waste resources.

As another example, the encoder component 203 or the rewriting component 204 may leave the raw message bytes in a queue, database, or other durable store until they are needed. The rewritten canonical message may, in this case, include a location reference that may be used to retrieve the raw message bytes. This allows the rewritten canonical message to be persisted or retransmitted to other message processors without having to make multiple copies of the raw message bytes. Furthermore, if retrieving the raw message bytes causes an application crash (making the message unprocessable), the rewritten canonical message may be sent to another system where the same raw message bytes can be retrieved successfully (making the message merely badly-formed). The reason for this difference is that the application may attempt to perform logic or significant processing in the transport or encoder components while the other system may be a diagnostic or forensic application that is more tolerant of errors in the raw message bytes.

The rewritten message metadata contains a distinguishing annotation, such as a unique SOAP action, that permits higher level components to detect that this is a rewritten message. The rewritten message may also contain the reason why the raw message bytes could not be translated, the locations of errors in the raw message bytes, or information about the runtime processing state within the encoder component when errors were detected.

The rewritten bad format canonical message is then provided to the higher level components (act 307). Referring to FIG. 2, the rewriting component 204 provides the bad format canonical message to the higher level components 205 via the network transport components 202 (see arrows 215 and 216).

Figure 4:
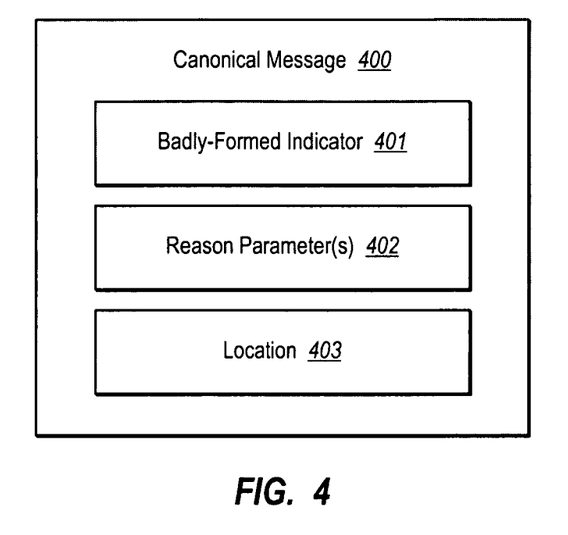
FIG. 4 schematically illustrates a data structure of a canonical message that may be constructed by the rewriting component of FIG. 2.

FIG. 4 schematically illustrates a data structure of a canonical message 400 that may be constructed by the rewriting component. The canonical message 400 includes sufficient information for downstream processing to determine that the message was not well-formed. For instance, badly-formed indicator field 401 may accomplish such a notification to those higher level components that process the canonical message 400. The canonical message 400 includes one or more reason parameters 402 relating to a reason that the message is not well-formed. The canonical message 400 may further include a location indicator 403 indicating a location of the message that is causing the message to not be well-formed.

In one embodiment, the canonicalized message format may be a schema of hierarchically structured trees of name-value pairs. An example of such a schema is the Simple Object Access Protocol (SOAP) specifications. The following represents an example of a SOAP envelope that conforms with version 1.2, and that is an example of a bad format canonical message. Line numbering is added for clarity.

```
1.   <?xml version="1.0" encoding="utf-8"?>
2.   <env:Envelope    xmlns:env="http://www.w3.org/2003/05/
     soap-envelope"
        xmlns:badformat="http://schemas.microsoft.com/2006/06/
        badformat"
        xmlns:wsa="http://www.w3.org/2005/08/addressing">
3.      <env:Header>
4.         <wsa:Action>http://schemas.microsoft.com/2006/06/badformat
           </wsa:Action>
5.         <badformat:Error env:mustUnderstand="true">
```

-continued

```
6.         <badformat:ErrorOffset>10</badformat:ErrorOffset>
7.         <badformat:ErrorReason>
8.            badformat:InvalidCharacterSequence
9.         </badformat:ErrorReason>
10.       </badformat:Error>
11.    </env:Header>
12.    <env:Body>
13.       <env:Fault>
14.          <env:Code>
15.             <env:Value>env:Sender</env:Value>
16.             <env:Subcode>
17.                <env:Value>badformat:BadFormat</env:Value>
18.             </env:Subcode>
19.          </env:Code>
20.          <env:Reason>
21.             <env:Text xml:lang="en">Unable to process received
                message</env:Text>
22.          </env:Reason>
23.          <env:Detail>
24.             <badformat:Data> . . . stream of bytes from communi-
                cation medium . . . </badformat:Data>
25.          </env:Detail>
26.       </env:Fault>
27.    </env:Body>
28. </env:Envelope>
```

Lines 2-28 represent the entire SOAP envelope expressed in eXtensible Markup Language (XML) version 1, and encoded using UTF-8 (see line 1). The header element extends from lines 3-11. First the headers will be discussed.

Line 4 represents an Action element having a value "http://schemas.microsoft.com/2006/06/badformat". This Action element is used to dispatch messages during subsequent message processing. The bad format action is provided by the encoder and is not an action that is specific to any particular application. If the message were a normal canonical message, the Action element would include one of a set of one or more application-specific actions. The badformat action is an indicator to any higher level component capable of interpreting the action that the canonical message was generated using a badly-formed input message. Referring to FIG. 4, line 4 of this SOAP example represents an example of the badly-formed indicator 401 of FIG. 4.

Lines 5 through 10 represent a badformat header element. In this case, any message processor capable of handling the canonical message must understand the badformat header element (see the "mustUnderstand" attribute of line 5).

Line 6 indicates an error offset of the error that caused the input message to be badly-formed. In this case, the error is in the tenth byte. The ErrorOffset element of line 6 represents an example of the Location indicator field 403 of FIG. 4.

Lines 7-9 indicate a computer-readable reason for the error. In this case, an invalid character sequence caused the error. The ErrorReason element of lines 7-9 represents an example of the reason parameter(s) field 402 of FIG. 4.

The Body element extends from lines 12 to 27. In this case, the Body element includes a single Fault child element that extends from lines 13-26. The Fault element is used in SOAP to reference information regarding any error condition.

The Fault element includes a child Code element that extends from lines 14-19. In this case, the Value child element at line 15 indicates a Sender value for the code, which is used in cases where the sender did something to cause the fault. In this case, the sender did not send a well-formed message, thereby causing the fault. The Code element includes a mechanism whereby a hierarchy of subcodes and associated values may be used to establish a well developed hierarchy focusing on various codes of the fault. In this case, there is only one node of the code hierarchy having a value expressed at line 17. However, the code hierarchy could be much more developed than this. For instance, the parent Subcode element might have a value of "BadFormat", but have child Subcode elements for each of the various possible causes for the error (e.g., invalid character sequence, invalid content type). Other codes may specify whether higher level components may perform compensatory actions to make the message well-formed, and if so, perhaps what kind of higher level components may do the compensatory actions.

Lines 20-22 represent a Reason element that express a human-readable reason for the error.

Lines 23-25 represent a Detail element that includes various details of the error. In this case, a child element called "Data" actually includes all of the raw message bits.

Figure 5:
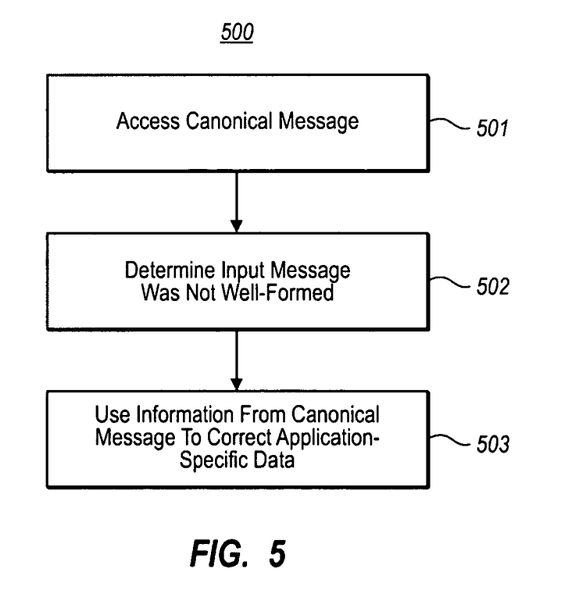
FIG. 5 illustrates a flowchart of a method for correcting a badly-formed message.

FIG. 5 illustrates a flowchart of a method 500 for correcting a badly-formed message. The method 500 will be described with frequent reference to the environment 200 of FIG. 2, and with frequent reference to the SOAP example provided above. The method 500 may be performed by the higher level components 205 of FIG. 2. However, the method 500 may be performed in other environments, and is not limited to any particular format of bad format canonical messages.

The canonical message is first accessed (act 501). For instance, referring to FIG. 2, the normal canonical messages are accessed by the higher level components 205 from the encoder component 203 via the network transport component 202. Likewise, the bad format canonical messages are accessed by the higher level components 205 from the rewriting component 204 via the network transport component 202.

In the case of a bad format canonical message, some of the higher level components may then determine that the application specific data of the canonical message is not well-formed (act 502). In other words, the higher level components determine that the canonical message is not a normal canonical message, but is a bad format canonical message. For instance, referring to FIG. 4, the higher level component may read the badly-formed indicator 401 from the canonical message, which is indicative that the application specific data is not well-formed. In one embodiment, as previously mentioned, the badly-formed indicator 401 may be a non-application-based action, that is included where the application action should be if the canonical message was normal. In the SOAP example, line 4 specifies a "http://schemas.microsoft.com/2006/06/badformat" action and thus serves as the badly-formed indicator.

Information from the canonical message is then used to correct the application specific data such that the application specific data becomes well-formed (act 503). For instance, referring to the SOAP example, the location indicator (at line 6) may be used to allow the higher level component to focus on the bytes at that location in determining the cause, and a possibly resolution to the error. A cause of the error may also be obtained by reasoning information from the bad formal canonical message. In the SOAP example, lines 8 and 16-18 may be evaluated to determine a cause for the error. The higher level component may then determine how the application specific data needs to change based on the identified cause and location. The higher level component may then actually change the application specific data in the identified manner.

Accordingly, embodiments have been described in which a canonical message may be generated even if the application specific data is not well-formed. Accordingly, processing may proceed down the same pipeline regardless of whether the initial message comprising the application specific data is well-formed, or not well-formed. This allows the complexity of an application that consumes the application specific data to be simplified with possible improvement in performance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. A system for canonicalizing messages regardless of whether the message is well-formed or not well-formed, the system comprising one or more computer processors and computer-readable memory having stored therein computer-executable instructions that are executable by the one or more computer processors to configure the system to perform operations comprising:
   accessing a message that contains application-specific data consumable by an application, the message having been sent from a message source and intended for delivery to a destination;
   determining whether or not the message is well-formed by validating the data in the message against a content type and required encoding format;
   if it is determined that the message is not well-formed and prior to delivery to the destination, rewriting the message by generating a canonical message that conforms to a canonical message format that is used regardless of whether the message is or is not well-formed, including in the generated canonical message all of the raw bits of the application-specific data, and including in the generated canonical message sufficient information for downstream processing of the canonical message to determine that the message was not well-formed; and
   forwarding the generated canonical message to the destination.

2. A system in accordance with claim 1, wherein the canonical message is a first canonical message, and the one or more computer-executable instructions are further structured to configure the system, if it is determined that the message is well-formed, to perform:
   generating a second canonical message that also conforms to the canonical message format, the second canonical message including the application-specific data expressed in a schema understood by the application.

3. A system in accordance with claim 2, wherein accessing a message that contains application-specific data consumable by an application, determining whether or not the message is well-formed, and generating a second canonical message are performed by an encoder.

4. A system in accordance with claim 1, wherein the computer-executable instructions are further structured such that when the canonical message is generated, the canonical message includes one or more parameters relating to a reason that the message is not well-formed.

5. A system in accordance with claim 4, wherein the computer-executable instructions are further structured such that when the canonical message is generated, the one or more parameters includes an indication of a location of the message that is causing the message to not be well-formed.

6. A system in accordance with claim 1, wherein the sufficient information for downstream processing of the canonical message to determine that the message was not well-formed comprises an action identifier that is expressed where the canonical message format has allocated a space to specify an application-specific action that is used by the application to dispatch the message.

7. A system in accordance with claim 6, wherein the action identifier is not an application-specific action.

8. A system in accordance with claim 1, wherein accessing a message that contains application-specific data consumable by an application, and determining whether or not the message is well-formed are performed by an encoder.

9. A system in accordance with claim 8, wherein generating a canonical message is performed by a rewrite component that is separate from the encoder.

10. A system in accordance with claim 1, wherein the canonical message format uses a hierarchically structured tree of name-value pairs.

11. A system in accordance with claim 10, wherein the canonical message format comprises Simple Object Access Protocol (SOAP).

12. A computer program product comprising one or more computer-readable storage devices having thereon computer-executable instructions that are executable by one or more processors of a computing system to configure the computing system to perform operations for rewriting a message that is not well-formed, the operations comprising:
    accessing a plurality of application messages, each containing corresponding application specific data, each intended for a corresponding application, each message having been sent from a message source and intended for delivery to a destination;
    for at least some of the plurality of application messages, determining whether or not the message is well-formed by validating the data in the messages against a content type and required encoding format;
    if the message is not well-formed, identifying at least one parameter related to a reason why the message is not well-formed;
    for at least one message that is determined to be well-formed and, prior to delivery to the destination, rewriting the at least one message that is determined to be well-formed by generating a first canonical message, that corresponds to the at least one message that is determined to be well-formed, that conforms to a canonical message format that is used regardless of whether the message is or is not well-formed, and including in the first canonical message all of the raw application-specific data expressed in a schema understood by the application;
    for at least one message that is determined not to be well-formed and, prior to delivery to the destination, rewriting the at least one message that is determined not to be well-formed by generating a second canonical message, corresponding to the message that is determined not to be well-formed, that also conforms to the canonical message format, including in the second canonical message all of the raw bits of the application-specific data, including in the second canonical message sufficient information for downstream processing of the corresponding second canonical message to determine that the message was not well-formed, and including in the second canonical message one or more of the at least one parameter related to the reason why the message is not well-formed;
    forwarding the rewritten well-formed message to the destination; and
    forwarding the rewritten not well-formed message to the destination.

13. A method for correcting data from an originally badly-formed message, the method comprising:
    accessing a canonical message that includes application specific data intended for an application,
        the canonical message having been generated by rewriting an original badly-formed message by generating a canonical message in a canonical format that is used regardless of whether the canonical message includes application specific data that is well-formed or not well-formed,
        the original badly-formed message having been sent from a message source and intended for delivery to a destination but data in the message having failed a validation against a content type and required encoding format,
        the original badly-formed message having been rewritten in the canonical message format prior to delivery to the destination,
        the canonical message also comprising a particular data field comprising an indicator of whether the application specific data is not well-formed, and
        the particular data field having been included in the canonical message by a rewriting component in order to indicate the application specific data is not well-formed;
    reading the particular data field;
    determining from the indicator in the particular data field that the application specific data of the canonical message is not well-formed; and
    using information from the canonical message to correct the application specific data such that the application specific data becomes well-formed.

14. A method in accordance with claim 13, wherein determining that the application specific data of the canonical message is not well-formed further comprises:
    reading a non-application action from the canonical message, the non-application action not being specific to the intended application; and
    determining that the non-application action is indicative that the application specific data is not well-formed.

15. A method in accordance with claim 14, wherein using information from the canonical message to correct the application specific data such that the application specific data becomes well-formed comprises:
    an act of identifying a location of a cause of the application-specific data not being well-formed based on information read from the canonical message; and
    an act of changing the application specific data at the identified location.

16. A method in accordance with claim 13, wherein using information from the canonical message to correct the application specific data such that the application specific data becomes well-formed comprises:
    an act of identifying a cause of the application-specific data not being well-formed based on information read from the canonical message.

17. A method in accordance with claim 16, further comprising:
    an act of identifying how the application specific data needs to change based on the identified cause.

18. A method in accordance with claim 17, further comprising:
    an act of changing the application specific data in the manner identified.

* * * * *